United States Patent

Beeskow et al.

[11] 4,036,341
[45] July 19, 1977

[54] CLUTCH PLATE WITH MULTIPLE SPRING AND FRICTION DAMPERS

[75] Inventors: Bruno Beeskow, Bietigheim; Günter Wörner, Rommelshausen; Peter Schrape, Stuttgart, all of Germany

[73] Assignee: Daimler-Benz Aktiengesellschaft, Germany

[21] Appl. No.: 585,839

[22] Filed: June 11, 1975

[30] Foreign Application Priority Data

June 24, 1974 Germany .............................. 2430160

[51] Int. Cl.² .............................................. F16D 3/14
[52] U.S. Cl. .................................................. 192/106.2
[58] Field of Search ........................... 192/106.1, 106.2

[56] References Cited

U.S. PATENT DOCUMENTS

| | | | |
|---|---|---|---|
| 3,863,747 | 2/1975 | Werner et al. | 192/106.2 |
| 3,982,617 | 9/1976 | Worner | 192/106.2 |

*Primary Examiner*—Benjamin W. Wyche
*Attorney, Agent, or Firm*—Craig & Antonelli

[57] ABSTRACT

A clutch disk for motor vehicle main clutches which is equipped with a disk member carrying the friction linings and torsionally elastically arranged with respect to a hub member, whereby for a multistage torsional elasticity, several springs or spring sets with different characteristics are arranged in windows of one of a hub flange or of the disk member and of a lateral sheet metal member rigidly connected thereto, which cooperate with correspondingly larger windows in the respective other part; friction damping devices are thereby coordinated to the springs, whereby one of the friction damping devices is operable in the idling range and the others are operable in the operating range and the start of operation thereof are determined by control means engaging in the corresponding windows or cooperating with the corresponding spring ends; at least three spring stages of continuously harder characteristics, one friction device for the idling range and two separate main friction devices with control members for the operating range are thereby provided in the clutch disk according to this invention, whereby the control members are so constructed and arranged that the friction disk for the idling range is coordinated to the control member for the first main friction device so that with the beginning of the second spring stage, in lieu of the idling friction device, the effect of the first main friction device commences and the effect of the second main friction device commences still within the range of the second spring stage in such a manner that its damping action starts in addition to the damping action of the first friction device already within the range of the second spring stage by a corresponding dimension of the control member with respect to the windows or spring ends of the third stage.

15 Claims, 5 Drawing Figures

CLUTCH PLATE WITH MULTIPLE SPRING AND FRICTION DAMPERS

The present invention relates to a clutch disk for motor vehicle main clutches with a disk member carrying the friction linings and torsionally elastically arranged with respect to a hub member, whereby for a multi-stage torsional elasticity, several springs or spring sets with different characteristics are arranged in windows of a hub flange or of the disk member and of a lateral sheet metal member rigidly connected with the disk member, which cooperate with correspondingly larger windows in the respectively other part (lateral sheet metal member or hub flange), whereby frictional damping devices are coordinated to the springs, one of the damping devices being effective in the idling range and the others being effective in the operating range and the starting points of operation thereof being determined by control means which engage by means of lugs, tabs, arms or the like in the corresponding windows or cooperate with the spring ends and whose frictions are cumulative.

Clutch disks of the aforementioned type are known already, for example, by the Democratic Republic of Germany, Pat. No. 62,494 and by the German Gebrauchsmuster 1,985,802. A damping device for the idling and a second damping device for the operating range is thereby provided in this prior art. With clutch disks of this type there always exists the desire for a matching and coordination of the respectively required damping action which is as accurate as possible, also in the respective operating conditions. The present invention is therefore concerned with the task to fulfill this desire with constructively simple means. Additionally, a clutch disk is to be proposed by the present invention in which the idling range does not extend into the operating range.

The underlying problems are solved according to the present invention with the clutch disks of the aforementioned type in that at least three spring stages of continuously harder or stiffer characteristics, one friction device for the idling range and two separate main friction devices with sheet metal control members for the operating range are provided, whereby the sheet metal control members are so constructed and arranged that the friction disk for the idling range is coordinated to the sheet metal control member for the first main friction device so that with the beginning of the second spring stage, in lieu of the idling friction device, the effect of the first main friction device commences, and the effect of the second main friction device starts still within the range of the second spring stage in such a manner that in addition to the damping of the first main friction device, its damping starts already within the range of the second spring stage by a corresponding spacing of its sheet metal control member with respect to the windows or the spring ends of the third stage.

An accurate adaptation and matching of the friction, i.e., therefore of the desired damping to the respectively prevailing operating condition can be achieved by the construction according to the present invention. As a result of the proposed selection of the starting points of operation of the friction devices, the ranges of the stage springs are once again advantageously subdivided, i.e., the now attained characteristics follow even more closely to the desired ideal curve. Above all, however, the idling friction is eliminated in the operating range so that the friction disk for the idling range is not subjected to wear within the operating range. This essential and significant advantage also remains preserved if within the scope of the general inventive concept occasionally the starting point of the friction devices should coincide with those of the stage springs.

It is additionally proposed by the present invention that both sheet metal control members together with their main friction devices are arranged each on one side of the hub flange and the sheet metal control members accommodate at their inner circumference the two friction devices on sleeve extensions. In principle, this results therefore, in a certain sense, in a symmetrical arrangement in relation to the hub flange.

With respect to the idling friction device, it is proposed in a first embodiment that the friction disk of the idling friction device is arranged between the hub flange and the first sheet metal control member and that the spring coordinated thereto is disposed on the other side of the hub flange between the latter and the second sheet metal control member. In this embodiment, the parts of the idling friction device are also distributed, so to speak of, over both sides of the hub flange.

In another embodiment according to the present invention, the idling friction device, consisting of a friction disk, covering sheet metal member and cup spring, is disposed between the hub flange and the first sheet metal control member and the sheet metal covering member is thereby non-rotatably connected with the first sheet metal control member. For that purpose, the sheet metal covering member is provided at its outer circumference with several, laterally bent-off tongues, by means of which it engages in corresponding slots provided in the first sheet metal control member.

Accordingly, it is an object of the present invention to provide a clutch disk for vehicle main clutches which avoids by simple means the aforementioned shortcomings and drawbacks encountered in the prior art.

Another object of this present invention resides in a clutch disk for motor vehicle main clutches in which an accurate matching of the respectively required damping is achieved in all operating conditions.

A further object of the present invention resides in a clutch disk for motor vehicle main clutches in which an accurate adaptation of the damping is achieved with constructively simple means, and in which idling range substantially does not extend into the operating range.

A still further object of the present invention resides in a clutch disk of the type described above which permits an accurate adaptation of the friction to all existing operating conditions.

Still another object of the present invention resides in a clutch disk for main clutches of motor vehicles in which the actually achieved characteristics follow closely the desired ideal curve.

A further object of the present invention resides in a clutch disk of the type described above in which wear and tear of the parts is minimized, particularly as regards the friction disk for the idling range.

These and other objects, features and advantages of the present invention will become more apparent from the following description when taken in connection with the accompanying drawing which shows, for purposes of illustration only, several embodiments in accordance with the present invention, and wherein.

Figure 1:
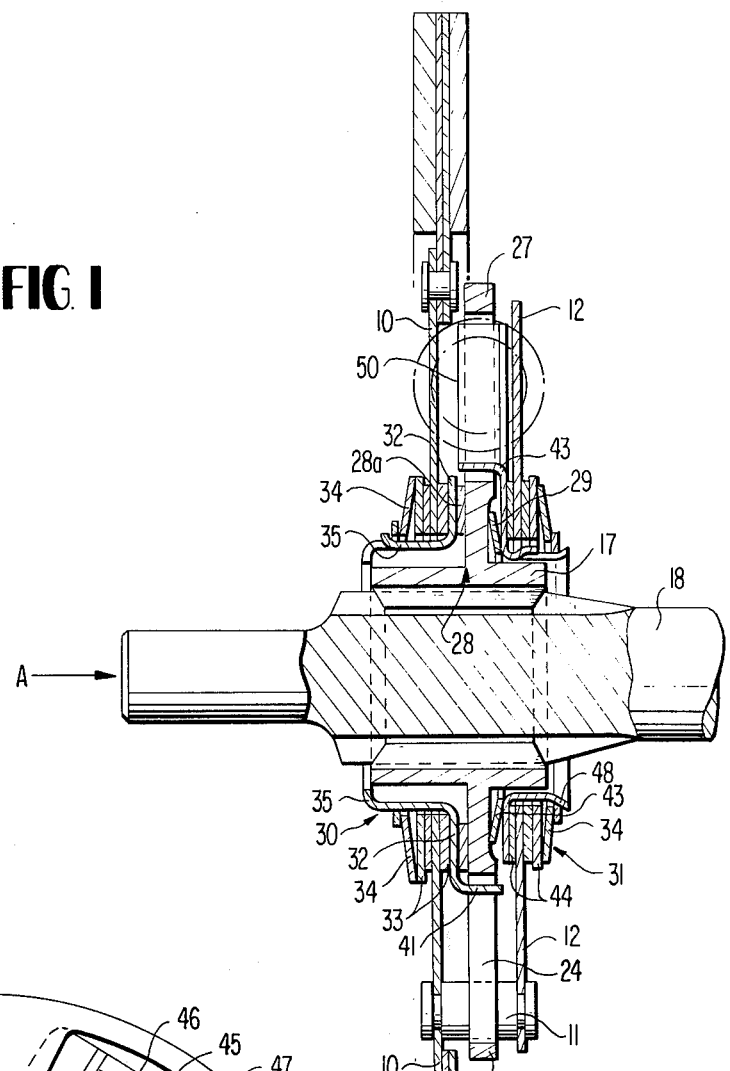
FIG. 1 is an axial cross-sectional view through a clutch disk in accordance with the present invention.
Figure 2:
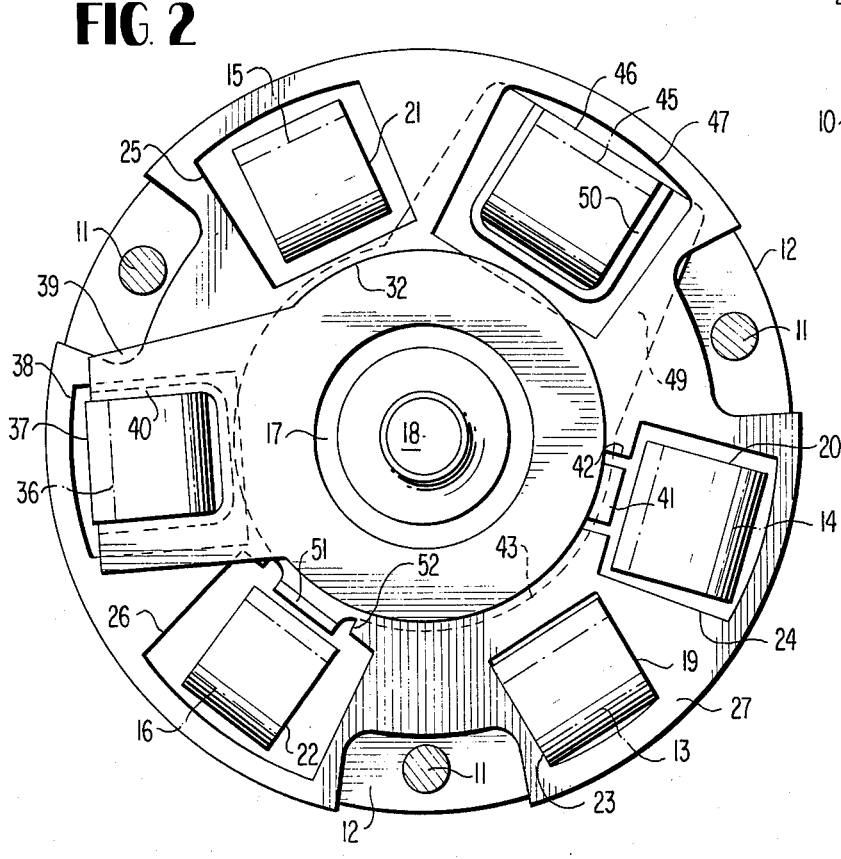
FIG. 2 is an elevational view of the clutch disk taken in the direction of arrow A according to FIG. 1, with the disk member removed and illustrating the control disks and spring arrangement of the clutch disk in accordance with the present invention.

Referring now to the drawing wherein like reference numerals are used throughout the various views to designate like parts, and more particularly to FIGS. 1 and 2, according to these figures the disk member 10 carrying the friction linings is rigidly connected with a lateral sheet metal member 12 in the usual manner by way of bolts 11. This entire system is connected by way of several stage springs 13 – 16 (FIG. 2) whose stiffness increases continuously, with a hub member 17 which, in its turn, is mounted on the drive shaft 18 so as to rotate in unison therewith, for example, by a splined connection. The stage spring 13 (FIG. 2) is effective in the idling range whereas the stage springs 14 to 16 are coordinated to the operating range of the clutch. All stage springs 14 to 16 are accommodated in correspondingly dimensioned windows 19 to 22 of the system consisting of the lateral sheet metal member 12 and of the disk member 10. Windows 23 to 26 are respectively coordinated thereto which are provided in the hub flange 27. In connection with the idling spring 13, the two windows 19 and 23 are of equal dimensions whereas with the other stage springs, the windows 24 to 26 in the hub flange 27 are larger to an ever-increasing extent than the corresponding windows 20 to 22 in which the springs rest. The starting point of operation of the respective spring stage is determined by this spacing.

A friction device generally designated by reference numeral 28 with a spring 29 is provided for the damping of the idling vibrations. A first main friction device generally designated by reference numeral 30 and a second main friction device generally designated by reference numeral 31 take care of the damping in the operating range. The first main friction device 30 consists of the sheet metal control member 32, of the friction disks 33, on both sides of the disk member 10 and of the cup spring 34 which produces the corresponding abutment force at the friction disks 33. A sleeve portion 35 provided at the sheet metal control member 32 thereby accommodates the entire main friction device 30. Furthermore, a first control spring 36 belongs to the first main friction device 30 which is also retained in a corresponding window 37 in the disk member 10 and in the lateral sheet metal member 12. A corresponding window 38 in the hub flange 27 is also coordinated to this first control spring 36.

The sheet metal control member 32 (FIG. 2) includes an approximately radially extending fork-like arm 39, whose two arm portions project with an approximately balcony-like constructed and essentially axially extending pressed-out portion 40 into the window 38 provided in the hub flange 27 and surround thereat the first control spring 36. Approximately on the opposite side, the sheet metal control member 32 includes an axially bent-off tab or lug 41 which projects into a radially recessed portion 42 of the window 24 of the second spring stage. The starting point of operation of the first main friction device is determined by the dimension of the distances——measured in the circumferential direction—between the pressed-out portion 40 and the window 38 and between the tab 41 and the radially recessed portion 42.

The second main friction device 31 has in principle the same construction. It also includes a sheet metal control member 43 with friction disks 44 and a second control spring 45 which is retained in a window 46 of the disk member 10 and of the lateral sheet metal member 12. A correspondingly larger window 47 in the hub flange 27 is coordinated to the control spring 45. This second main friction device 31 is arranged on the other side of the hub flange 27 on a sleeve portion 48 of the sheet metal control member 43.

The construction of the second sheet metal control member 43 corresponds itself to that of the first sheet metal control member 32. Also, in this case a fork-like arm 49 extends with an axially extending balcony-like pressed-out portion 50 into the window 47 of the hub flange 27 and surrounds thereat the second control spring 45. On the opposite side an axially bent-off tab or lug 51 projects into a radial recess 52 of the window 26 of the fourth spring stage. Also that which was already mentioned with respect to the first main friction device applies as regards the distances to be considered in the circumferential direction between the control edges.

In the idling friction device 28, the friction disk 28a is located between the hub flange 27 and the first sheet metal control member 32, i.e., it is therefore coordinated to the first main friction device 30. Its spring 29, however, is located on the other side of the hub flange 27 and is supported at the second sheet metal control member 43. The two main friction devices 30 and 31, is contradistinction thereto, are thereby arranged, each completely by itself, on the two sides of the hub flange mirror-image-like or symmetrical to one another.

In the described clutch disk, the second main friction device 31 centers itself by means of its sleeve extension 48 on the hub member 17. In its turn, the system consisting of disk member 10 and lateral sheet metal member 12 is then centered on this sleeve portion 48 by means of the inner edge of the lateral sheet metal member 12. The first main friction device 30, in its turn, centers itself by means of the sleeve extension 35 provided on the sheet metal control member 32 at the inner edge of the disk member 10.

Figure 3:
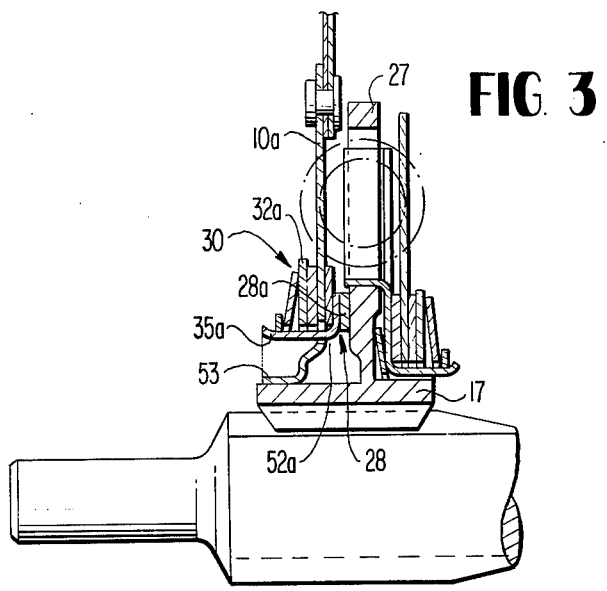
FIG. 3 is a partial cross-sectional view, similar to FIG. 1, through a second embodiment of a clutch disk in accordance with the present invention.

In order to render this centering more simple and to enable a direct centering of the disk member 10 at the hub 17, the sleeve portion 35a is now subdivided according to FIG. 3 into segments, for example, into three identical segments which are distributed uniformly over the circumference. The sheet metal control member 32a extends with these segments 35a through apertures 52a of the disk member 10a. A corresponding movability in the circumferential direction is thereby assured by the dimension of the respective apertures 52a and of the segments 35a. The disk member 10a can therefore now extend inwardly up to a sleeve extension 53, by means of which it is then in its turn directly centered on the hub 17. The construction in principle as regards the other parts is the same as already described hereinabove. Also, the idling friction device 28 has the same constructive principle, i.e., the friction disk 28a and the spring 29 are disposed on the two sides of the hub flange 27.

Figure 4:
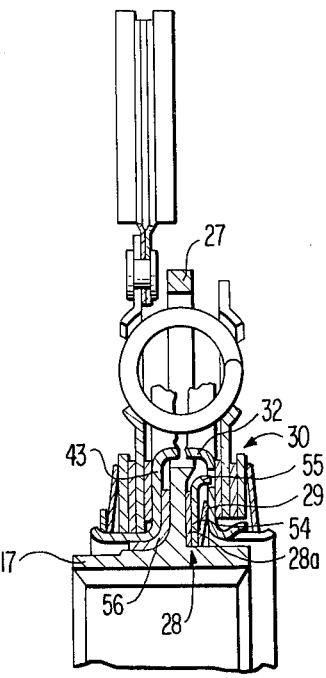
FIG. 4 is a partial cross-sectional view, similar to FIG. 3, through a third embodiment of a clutch disk in accordance with the present invention.

According to FIG. 4, also the idling friction device 28 is now combined on one side of the hub flange 27. It is located on the same side as the first main friction device 30. A sheet metal covering member 54 is arranged adjacent the friction disk 28a, which engages with laterally bent-off tongues 55 arranged at the outer circumference in corresponding apertures provided at the first sheet metal control member 32 in order to assure the rotational entrainment. The cup spring 29 is then disposed between the covering member 54 and the first sheet metal control member 32. The second sheet metal control member 43 is centered on the hub 17 by means of a centering sleeve 56.

Figure 5:
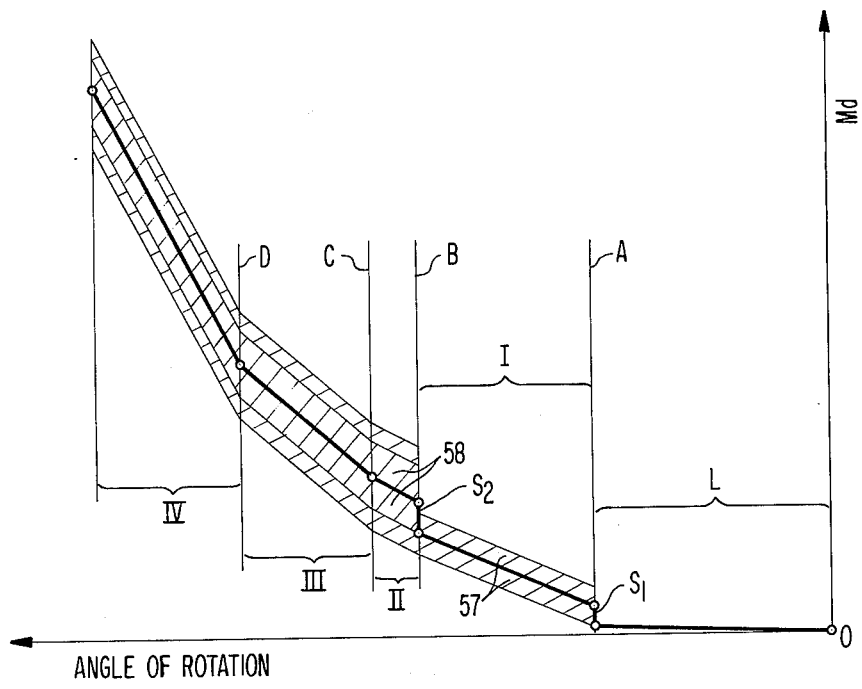
FIG. 5 is a diagram of the clutch disks according to FIGS. 1, 3 and 4, in which torque is plotted against angle of rotation.

According to FIG. 5, the idling stage spring 13 is effective together with the idling friction device 28 within the range L. The damping is thereby very slight and was not indicated in FIG. 5. At the point A, the second stage spring 14 commences to become effective in addition to the idling spring 13. Simultaneously, the play or clearance between the window 38 in the hub flange and the recess 42 has been used up and the first sheet metal control member 32 is now held fast, so to speak of, by the hub flange and the disk member 10 then continues to move against the action of the control spring 36. The idling friction device 28 now stops to be effective thereby, whereas in its place the effect of the first main friction device 30 now commences. Within the range I, therefore, the stage springs 13 and 14 (second stage) and only the first main friction device 30 with its control spring 36 are effective without the idling friction device 28. Since the control spring 36 is prestressed, a stage jump $S_1$ now results in the spring characteristics. The damping in the first main friction device 30 is illustrated by the areas 57 (FIG. 5).

At the point B, the same operation repeats itself as regards the second main friction device 31 whereby, however, the action of the first main friction device continues uninterruptedly. Also, the stage springs 13 and 14 (stage 2) remain effective. Within the range II, the stage springs 13 and 14 (second stage) now cooperate together with the first main friction device 30 which remains effective and additionally with the second main friction device 31. Since the control spring 45 of the second main friction device 31 is also prestressed, a second stage jump $S_2$ will result. The damping of the second main friction device 31 within the range II is illustrated by the areas 58. In this manner the two damping actions 57 and 58 will add, i.e., are cumulative.

At the point C, additionally the effect of the stage spring 15 (third stage) will now commence. The two main friction devices 30 and 31 continue to remain effective so that within the range III, the two added damping actions are effective together with the stage springs 13 to 15 of the third stage. The same is true analogously for the range IV; for at the point D only exclusively the stage spring 16 (fourth stage) is added whereas the added friction damping action remains effective in the already described manner. In all described embodiments, only the main friction devices are cumulative whereas the idling friction device is eliminated in the operating range.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A clutch disk for motor vehicle main clutches which comprises a disk means carrying friction linings and torsionally elastically arranged with respect to a hub means, several spring means with different characteristics being provided for a multi-stage torsional elasticity which are arranged in first window means, said hub means including a hub flange and said first window means being arranged in one of the two parts consisting of hub flange and disk means, said spring means also cooperating with corresponding larger, second window means provided in the respective other of said two parts, friction damping means coordinated to the spring means, one of said friction damping means being operable in the idling range and the others being operable in the operating range, and control means for determining the start of operation of the friction damping means operable in the operating range, characterized in that at least three spring stages of continuously harder characteristics, one friction means for the idling range and two separate main friction means with control means for the operating range are provided, each friction means including at least one friction disk, the control means being so constructed and arranged that the friction disk for the idling range is coordinated to the control means for the first main friction means so that with the beginning of the second spring stage, in lieu of the idling friction means, the effect of the first main friction means commences and the effect of the second main friction means still starts within the range of the second spring stage in such a manner that its damping action, in addition to the damping action of the first friction means, starts already within the range of the second spring stage by a corresponding distance of the control means thereof with respect to one of window means and spring ends of the third stage.

2. A clutch disk according to claim 1, characterized in that the control means include portions engaging into the respective window means.

3. A clutch disk according to claim 2, characterized in that said portions are tabs.

4. A clutch disk according to claim 2, characterized in that said portions are arms.

5. A clutch disk according to claim 2, characterized in that said control means include portions cooperating with the spring ends.

6. A clutch disk according to claim 1, characterized in that said control means are sheet metal control members.

7. A clutch disk according to claim 1, characterized in that several spring sets are provided as spring means with different characteristics.

8. A clutch disk according to claim 1, characterized in that the disk means includes a disk member substantially rigidly connected with a lateral member.

9. A clutch disk according to claim 6, characterized in that the two control members together with their main friction means are arranged each on one side of the hub flange and the control members receive at the inner circumference thereof the two friction means on sleeve extensions.

10. A clutch disk according to claim 6, characterized in that the friction disk of the idling friction means is arranged between the hub flange and the first control member and the spring coordinated thereto is arranged on the other side of the hub flange between the latter and the second control member.

11. A clutch disk according to claim 6, characterized in that the idling friction means, including its friction disk, a covering member and a cup spring is arranged between the hub flange and the first control member and in that the covering member is non-rotatably connected with the first control member.

12. A clutch disk according to claim 11, characterized in that the covering member is provided along its outer circumference with several laterally bent-off tongue portions by means of which it engages in corresponding slots provided in the first control member.

13. A clutch disk according to claim 1, characterized in that the friction disk of the idling friction means is arranged between the hub flange and the control means of the first friction means and the spring coordinated thereto is arranged on the other side of the hub flange between the latter and the control means of the second friction means.

14. A clutch disk according to claim 1, characterized in that the idling friction means, including its friction disk, a covering member and a cup spring is arranged between the hub flange and the control means of the first friction means and in that the covering member is non-rotatably connected with the last-mentioned control means.

15. A clutch disk according to claim 14, characterized in that the covering member is provided along its outer circumference with several laterally bent-off tongue portions by means of which it engages in corresponding slots provided in the control means of the first friction means.

* * * * *